US006437532B2

(12) United States Patent
Koerwer

(10) Patent No.: US 6,437,532 B2
(45) Date of Patent: *Aug. 20, 2002

(54) MOTOR VEHICLE DOOR LOCK AND PROCESS FOR ITS CONTROL

(75) Inventor: Matthias Koerwer, Wuppertal (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/780,628

(22) Filed: Feb. 12, 2001

(30) Foreign Application Priority Data

Feb. 11, 2000 (DE) ........................................ 100 06 118

(51) Int. Cl.[7] .................................................. H02P 7/00

(52) U.S. Cl. ....................... 318/445; 318/282; 318/466; 318/468; 318/286; 292/201; 292/341.16; 292/DIG. 3; 292/DIG. 66

(58) Field of Search ................................ 318/282, 286, 318/466, 468, 445; 292/DIG. 3, DIG. 23, DIG. 4, DIG. 66, 201, 341.16

(56) References Cited

U.S. PATENT DOCUMENTS 4,111,474 A * 9/1978 Heydner ..................... 292/144
4,843,849 A * 7/1989 Kamke et al. ................ 70/264
5,656,899 A * 8/1997 Kuroda ........................ 318/283
5,762,384 A * 6/1998 Bartel ......................... 292/216
6,139,073 A * 10/2000 Heffner et al. .............. 292/201
6,175,202 B1 * 1/2001 Weyerstall et al. ......... 318/280

FOREIGN PATENT DOCUMENTS

DE 198 19 611 11/1999

* cited by examiner

*Primary Examiner*—Robert E. Nappi
*Assistant Examiner*—Rina I. Duda
(74) *Attorney, Agent, or Firm*—Nixon Peabody LLP; David S. Safran

(57) ABSTRACT

The present invention is directed to a motor vehicle door lock such as a side door lock, a rear door lock, a rear hatch lock, or a hood lock and a process for controlling such a motor vehicle door lock, wherein the lock includes an electric motor drive for reaching a set position depending upon at least one start-up characteristic acquired when the electric motor drive is actuated and is at least one of shut off and short circuited prior to a set position in time and space.

14 Claims, 2 Drawing Sheets

MOTOR VEHICLE DOOR LOCK AND PROCESS FOR ITS CONTROL

BACKGROUND OF THE INVENTION

1. Field of the Invention

The invention pertains generally to a motor vehicle door lock such as a side door lock, a rear door lock, a rear hatch lock, or a hood lock and a process for controlling such a motor vehicle door lock.

2. Description of the Related Art

A motor vehicle door lock with the initially mentioned features is known from practice. Such a motor vehicle door lock has an electric motor drive for an assigned actuating or locking element of the motor vehicle door lock. The motor vehicle door lock further includes a sensor for acquiring the position, such as the rotary position, of the drive or the assigned actuating element, and a control means for positioning the drive or the actuating element in a set position and shutting off or short circuiting the drive at a shut-off point which precedes the set position in time and position. The electric motor drive at the shut-off point has a certain energy of motion which leads to a not inconsiderable slowing down, therefore, to further move until the drive, and thus, the actuating element stop. Accurate positioning of the actuating element in the set position is, however, only possible if the actual slowing down is considered when the shutoff point is established. It has been found in practice that the slowing down depends upon various influences such that the positioning accuracy is adversely affected thereby.

SUMMARY OF THE INVENTION

An object of the invention is to provide a motor vehicle door lock with an electric motor positioning drive and a process for the control thereof so that accurate positioning under various operating conditions is easily and economically possible.

This object is achieved so that at least one of a start-up characteristic of the drive and a start-up characteristic of the assigned actuating element when the drive is actuated (turned on) is acquired or determined and that at least the start-up characteristic is used to establish a shut-off point which precedes the set position in time and position. Therefore, the start-up behavior of the drive can also be used to draw conclusions about the braking behavior of the drive, thus, without using an additional sensor, enhanced and more accurate characterization of the operating behavior of the drive and its electric motor is possible.

In general, a plurality of different start-up characteristics can be determined. In an exemplary embodiment of the invention, the voltage which is applied to the drive or its electric motor when the drive is actuated is acquired as a first start-up characteristic, at least if it can vary, and at least one of the initial speed, acceleration and values of at least one of the drive and the assigned actuating element which correspond thereto and/or which are derived therefrom is acquired as a second start-up characteristic. It has been found that by means of these start-up characteristics, the required time or positional setting of the shut-off point in advance of the set position which is to be assumed in the shut-off state can be established or determined. This is explained by the fact that from the two indicated start-up characteristics, the temperature of the drive, which has a major effect upon its braking and shut-off behavior, can be estimated or approximately determined using these start-up characteristics. Accordingly, depending upon the estimated temperature or the aforementioned start-up characteristics, the advanced positioning of the shut-off point which is necessary for accurate positioning can be ascertained.

Other details, features, objectives and advantages of this invention are detailed below using the drawings of one preferred embodiment.

DETAILED DESCRIPTION OF THE INVENTION

Figure 1:
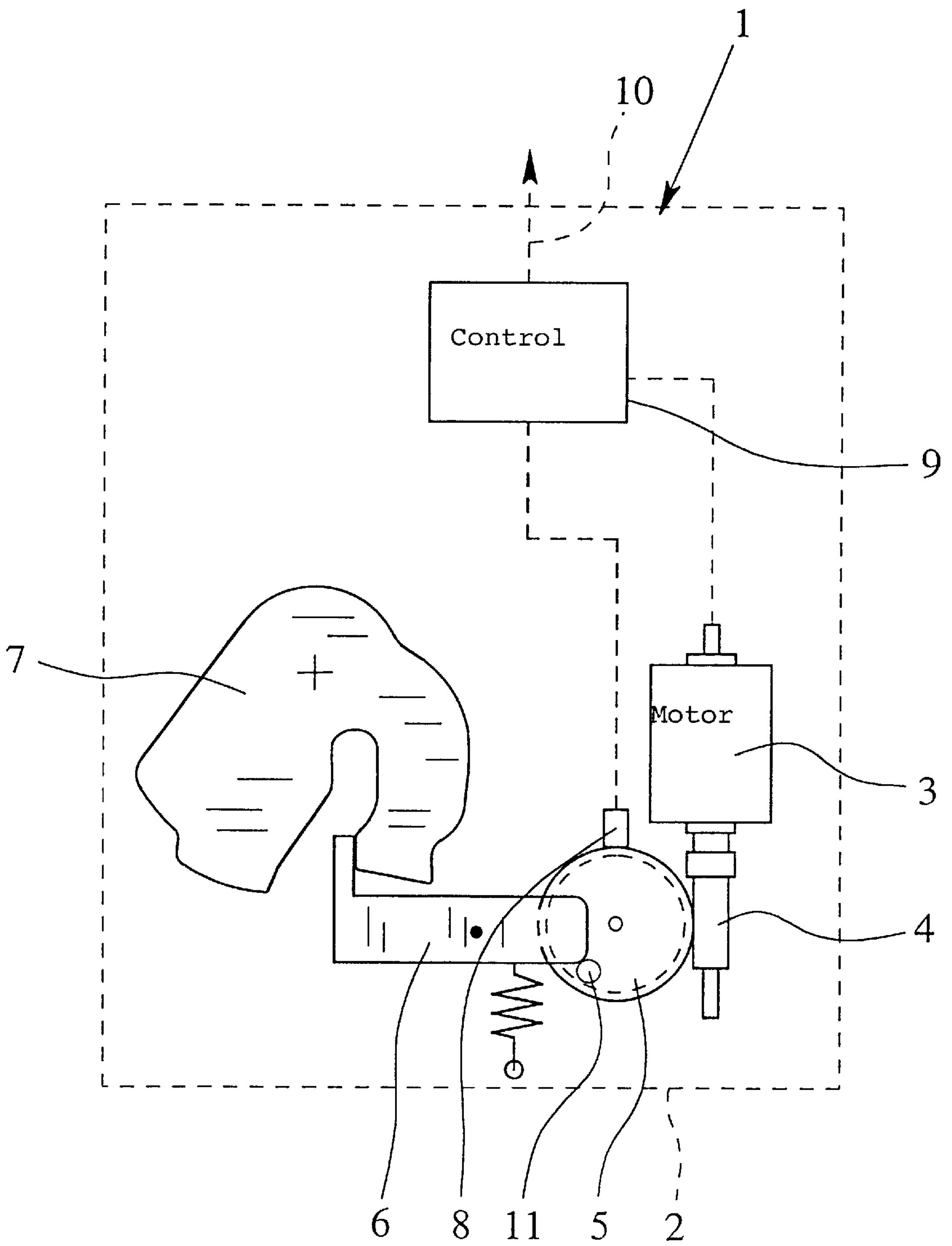
FIG. 1 shows a schematic of a motor vehicle door lock in accordance with the invention.

And now to the drawings, in which FIG. 1 shows a motor vehicle door lock 1 in accordance with the present invention including a housing 2 (indicated by the broken line) and an electric motor drive 3. The drive 3 comprises an electric motor (not shown) and an adjoining transmission such as a worm gear 4. The drive 3 acts on or engages a locking or actuating element 5 of the motor vehicle door lock 1 for positioning the actuating element 5 in at least one set position. The locking or actuating element 5 represents one part of a conventional lock mechanism of the motor vehicle door lock 1 and acts on or engages a detent pawl 6 which is used to secure the assigned lock latch 7 of the motor vehicle door lock 1. Moreover, the locking or actuating element 5 may also assume additional functions, and optionally, several actuating functions, and may be positioned especially in the latter case in several set positions.

The motor vehicle door lock 1 furthermore includes a sensor 8 electrically connected to the electric motor drive 3 for acquiring at least one of an angular position and angular velocity of at least one of the electric motor drive 3 and said actuating element 5. The sensor 8 may also be integrated into the drive 3. The sensor 8 is made as an incremental detector for acquiring the angular position of the actuating element 5, the electric motor and the worm gear 4. The sensor 8, however, can also be formed by some other means for acquiring, or optionally, indirectly determining at least one of the actuating or rotary position, the speed and the acceleration of at least one of the drive 3 and the actuating element 5. For example, the sensor 8 may also be a Hall sensor or a plurality of Hall sensors or at least one microswitch or the like.

The motor vehicle door lock 1 further includes a control means 9 for controlling the drive 3, for example, for actuating (and shutting off) the drive 3. The control unit 9 may be connected via a terminal 10 to the motor vehicle electronics (not shown), for example, a central interlock system, and/or an actuating switch. The sensor 8 is electrically connected to the control means 9 so that the control means 9 can acquire or at least indirectly determine at least one of the position and the speed of the actuating element 5 and/or the drive 3. Positioning in the desired set position is detailed below using FIG. 2. The actuating element 5 is preferably disk-like and has a journal-like function element 11 which projects in the axial direction of the actuating element 5 and swivels a detent pawl 6 depending upon the rotary position of the actuating element 5.

Figure 2:
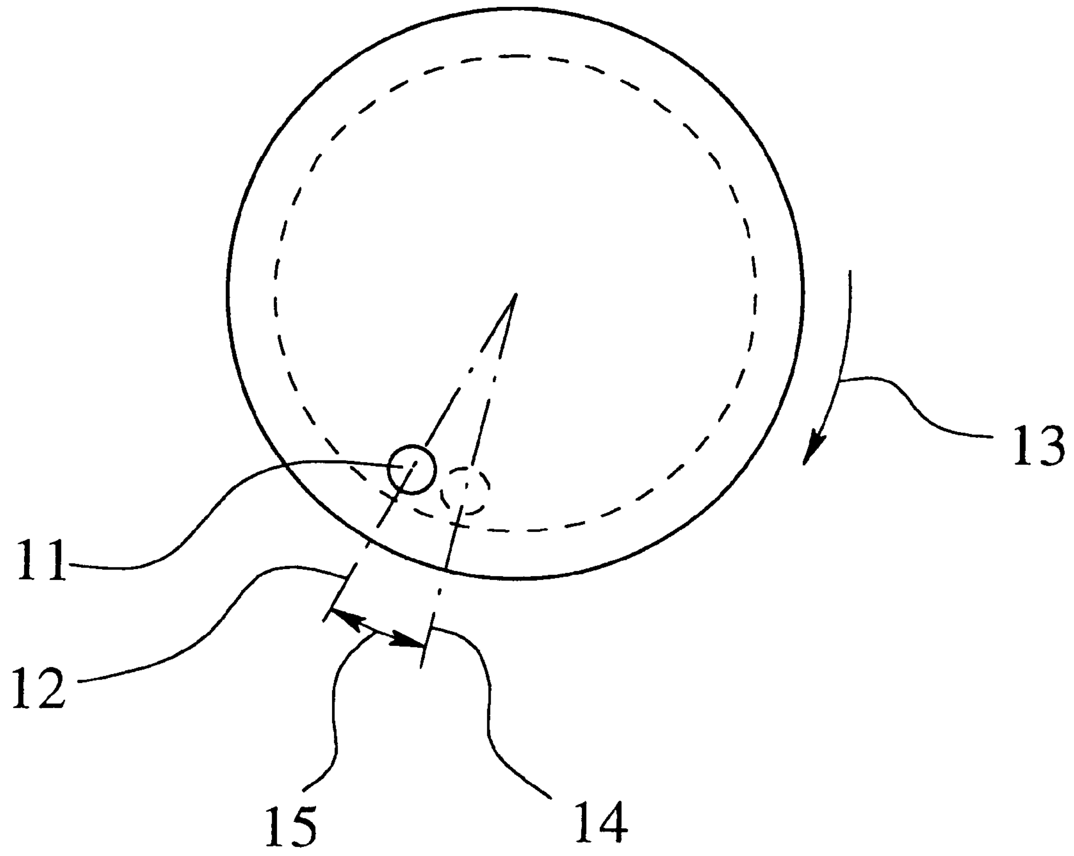
FIG. 2 shows a schematic of the determination of the shut-off point.

As shown in FIG. 2, to position the actuating element 5 or the function element 11 in a set position 12, such as a desired angular position, for the direction of motion or rotation 13 of the actuating element 5, the drive 3 or its electric motor is turned off at a shut-off point 14, and, depending upon the type of drive 3 or the electric motor and the desired braking, is preferably short-circuited. The shut-off point 14 is placed in advance of the set position 12 either positionally by the braking distance or the braking angle 15 against the direction of motion or rotation 13 of the actuating element, or in time by the braking time. The braking distance or braking time which is required by the drive 3 or the actuating element 5 after the drive 3 is shut off, therefore, starting from the shut-off point 14, depends upon slowing down the drive 3 and the actuating element 5 after the drive 3 is shut off. The shut-off point 14 can therefore be determined by the interval in time or space from the set position 12, depending upon how the control means 9 functions.

An advantageous aspect of the approach in accordance with the present invention lies in that when the drive 3 is actuated (turned on), or, in the immediately subsequent (start-up) phase, the control means acquires at least one start-up characteristic which at least indirectly characterizes the operating state of the drive 3 or its electric motor. This start-up characteristic, which is re-determined preferably for each turn-on or start-up, is subsequently used to fix, vary or correct the shut-off point 14. Preferably, the start-up characteristics are acquired or updated each time the drive 3 is actuated (turned on). However, acquisition can be repeated only when a stipulated minimum time has transpired. The expression "start-up characteristic" should be understood by those skilled in the art in the sense that at least one parameter is encompassed which allows characterization of the starting behavior of the drive 3 which depends upon the current operating state. In addition, several start-up characteristics can also be acquired.

In accordance with the present invention, a start-up characteristic such as distance or the angular displacement by the drive 3 or the actuating element 5 in a definable time from the actuation (start-up) or engagement of the drive 3 may be acquired. Alternatively, a start-up characteristic such as the time necessary for a certain distance traveled or a certain angular displacement may be acquired. One such start-up characteristic in combination with the voltage applied to the drive 3 allows for accurate determination or approximation of the temperature of the drive 3. Since heat has a major effect upon the braking behavior or the slowing down of the drive 3 and of the actuating element 5, the shut-off point 14 can be appropriately set or corrected directly from at least one of the indicated start-up characteristic and the voltage, and by an approximation of the temperature of the drive 3 or the correlated value of the shut-off point 14 so that positioning in the set position 11 at rest can be obtained.

Additionally, at least one of the initial or average speed, acceleration, and values of the drive 3 and the actuating element 5 derived from or corresponding to the aforementioned start-up characteristic can be determined or acquired as a start-up characteristic. Alternatively, at least one of the actual speed, actual acceleration, and the values of the drive 3 and the actuating element 5 which are derived therefrom or which correspond thereto can be determined or acquired as a start-up characteristic. In particular, in combination with the voltage applied to the drive 3, parameters arise for determining or estimating at least one of the temperature of the drive 3 and of the slowing down or the braking behavior of the drive 3. Current measurement or acquisition of the voltage applied to the drive 3 can be omitted if it is always constant; however, this is not always the case in a motor vehicle. In addition, the power consumption of the drive 3 in the start-up phase can be acquired as a start-up characteristic.

Preferably, each time the drive 3 is actuated a first start-up characteristic is acquired as to how long the drive 3 or the actuating element 5 should move by a predetermined angle of rotation, or the angular displacement of the drive 3 or the actuating element 5 moves within a predetermined time. This acquisition can be determined via the sensor 8 which is made preferably for position acquisition and which is provided in the control means 9 which includes a corresponding clock base or time base. Furthermore, the voltage applied to the drive 3 during the start-up phase is acquired as the second start-up characteristic via the control unit 9 since the control unit 9 supplies the drive 3 with voltage. Consequently, the two aforementioned start-up characteristics can be determined without additional effort.

Using the two aforementioned start-up characteristics, the temperature of the drive 3 can be determined or approximated by the control means 9 via at least one of a function and a table filed in the control unit 9. Subsequently, the expected slowing down or braking angle 15 of the drive 3 is ascertained from the temperature. Accordingly, the shut-off point 14 is established by the control means 9 and may take place by a shut-off point 14 which is stipulated as the base setting and a braking angle 15 which is stipulated as the base setting being corrected or changed depending upon the ascertained or acquired temperature. Of course, the braking angle 15 and/or the shut-off point 14 can also be directly determined from the two indicated start-up characteristics using at least one of the function and a table filed in the control means 9. It goes without saying that intermediate values can be interpolated if necessary. In addition, the control means 9 can be made such that, after shut-off and stopping of the drive 3, the actual position of the drive 3 is compared to the respective set position 14 and correction of the corresponding function parameters or table values is undertaken in order to adaptively enhance the positioning accuracy. The present invention is advantageous since, at very little cost, especially without an additional sensor means, accurate positioning can be obtained for prompt stopping and especially without control.

In accordance with the present invention, the actuating element 5 executes rotary motion, while the actuating element 5 may also execute linear or superimposed motion. In addition, the present invention is not limited to a motor vehicle door lock 1, but may also be applied to any electric motor positioning drive. The present invention is, however, used especially in actuating and drive systems in motor vehicles since economical and reliably operating systems with a simple structure are desired.

I claim:

1. A motor vehicle door lock comprising:

an actuating element;

an electric motor drive for engaging and positioning said actuating element;

a sensor electrically connected to said electric motor drive for acquiring a start-up characteristic of the electric motor comprised of at least one of an angular position and angular velocity of at least one of said electric motor drive and said actuating element when the electric drive is turned on; and control means for controlling stopping of said electric motor drive based upon signals received from said sensor, said control means producing a desired predetermined angular stopped position of said electric motor drive by at least one of turning off and short circuiting said electric motor drive at a shut-off point that precedes the predetermined angular stopped position in time and position, wherein at least one start-up characteristic of at least one of said electric motor drive and said actuating element is acquired by said control means for at least one of establishing and correcting the shut-off point.

2. The motor vehicle door lock as claimed in claim 1, wherein said actuating element is a drive disk.

3. The motor vehicle door lock as claimed in claim 1, wherein said actuating element is adapted to swivel a detent pawl depending upon a rotational position of the actuating element.

4. The motor vehicle door lock as claimed in claim 3, wherein said pawl is adapted to operate a lock latch.

5. The motor vehicle door lock as claimed in claim 1, wherein at least one of an angular displacement, time correlated to the angular displacement, angular speed and angular acceleration of at least one of said electric motor drive and said actuating element, a predetermined time after actuation of said electric motor drive, power consumed by said electric motor drive, and a voltage applied to said electric motor drive are determined as start-up characteristics.

6. The motor vehicle door lock as claimed in claim 5, wherein the temperature of said electric motor drive is at least one of determined and approximated based upon at least one of the angular speed and angular acceleration of at least one of said electric motor drive and said actuating element, and the voltage applied to said electric motor drive when said electric motor drive is actuated.

7. The motor vehicle door lock as claimed in claim 6, wherein the shut-off point is established based upon the temperature of said electric motor drive.

8. The motor vehicle door lock as claimed in claim 7, wherein the shut-off point is established via at least one of a braking distance and a braking time of said electric motor drive based upon the set position, and wherein the braking distance or the braking time is determined based upon at least one of a start-up characteristic and the temperature of said electric motor drive derived from said start-up characteristic.

9. A process for controlling a motor vehicle door lock having an electric motor drive for an assigned actuating element, said process comprising the steps of:

establishing a predetermined angular stopped position for said electric motor drive by at least one of shutting off and short circuiting said electric motor drive at a shut-off point which precedes the predetermined angular stopped position in time and position, acquiring at least one start-up characteristic for at least one of said electric motor drive and said actuating element for at least one of establishing and correcting the shut-off point of said electric motor drive; and stopping said electric motor drive based at the shut-off point that has been established and corrected based on said start-up characteristic so as to produce said predetermined angular stopped position.

10. The process as claimed in claim 9, wherein at least one of a distance traveled and an angular displacement of said electric motor drive, elapsed time, speed and acceleration of at least one of said electric motor drive and said actuating element, a predetermined time after start-up of said electric motor drive, power consumed by said electric motor drive, and a voltage applied to said electric motor drive are determined as a start-up characteristic.

11. The process as claimed in claim 10, wherein a temperature of said electric motor drive is at least one of determined or approximated using the speed and acceleration of at least one of said electric motor drive and said actuating element, the voltage applied to said electric motor drive upon actuation of said electric motor drive.

12. The process as claimed in claim 11, wherein the shut-off point is established based upon at least one of the determined or approximated temperature of said electric motor drive.

13. The process as claimed in claim 12, wherein the shut-off point is established via at least one of a braking distance and a braking time of said electric motor drive, based upon the set position, wherein at least one of the braking distance and the braking time is determined based upon at least one of a start-up characteristic and the temperature of said electric motor drive derived from said start-up characteristic.

14. The process as claimed in claim 13, wherein at least one start-up characteristic is acquired each time said electric motor drive is engaged.

* * * * *